No. 721,986. PATENTED MAR. 3, 1903.
F. R. WHITE.
STEERING APPARATUS.
APPLICATION FILED JUNE 12, 1902.
NO MODEL. 2 SHEETS—SHEET 1.
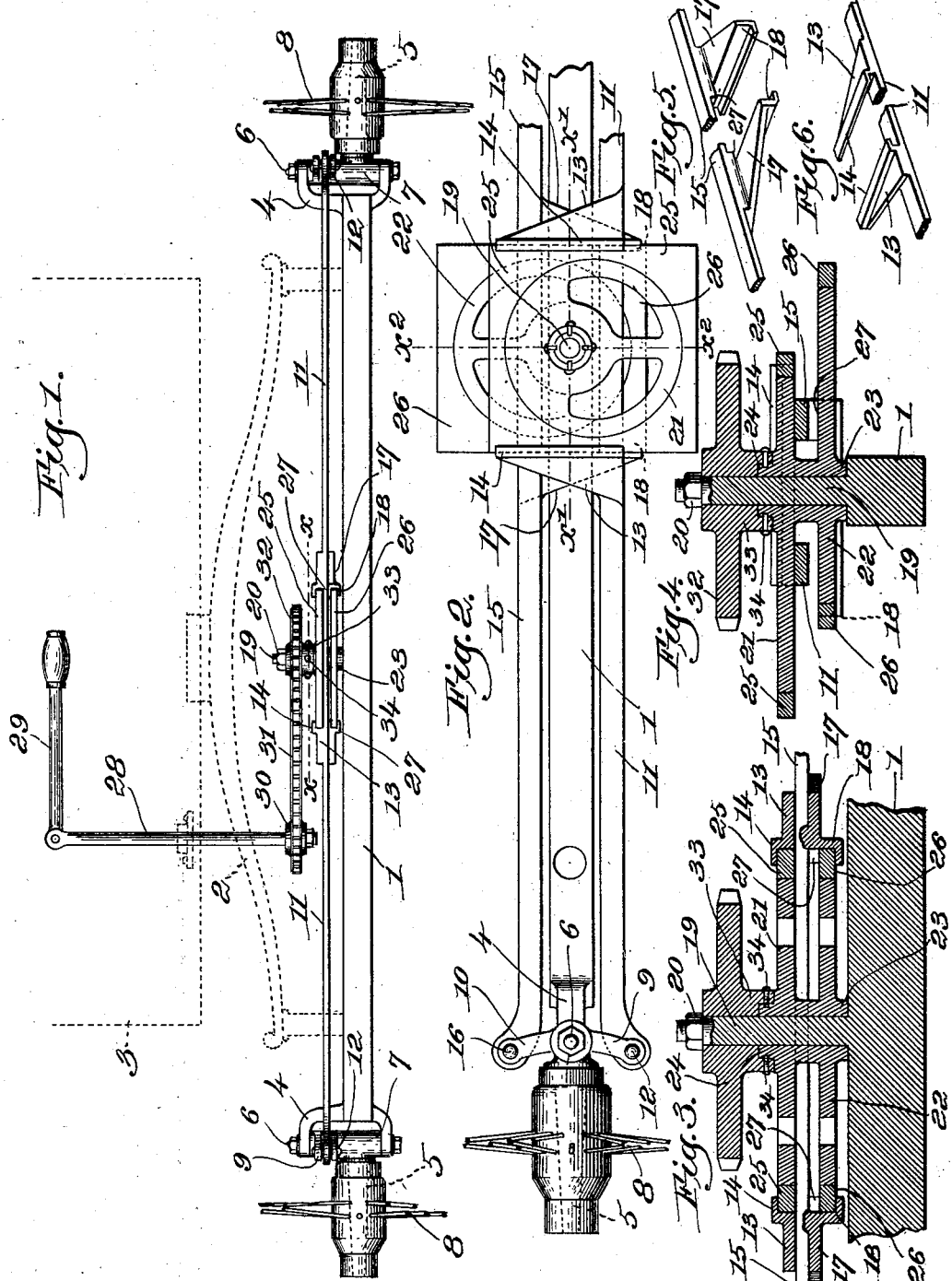
Witnesses.
Thomas J. Drummond.
Herman J. Sartoris.
Inventor.
Frederick R. White,
by Crosby Gregory
Atty's.

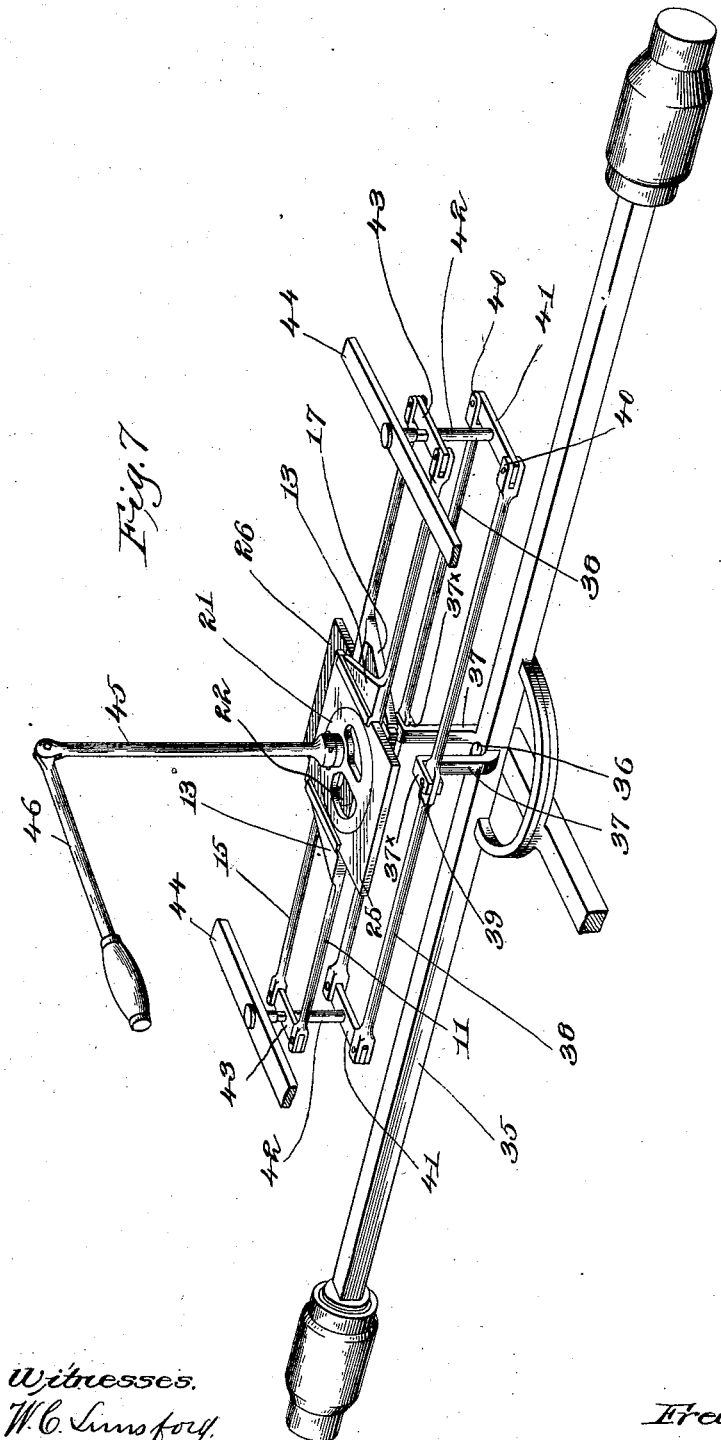

UNITED STATES PATENT OFFICE.

FREDERICK R. WHITE, OF LYNN, MASSACHUSETTS.

STEERING APPARATUS.

SPECIFICATION forming part of Letters Patent No. 721,986, dated March 3, 1903.

Application filed June 12, 1902. Serial No. 111,318. (No model.)

*To all whom it may concern:*

Be it known that I, FREDERICK R. WHITE, a citizen of the United States, and a resident of Lynn, county of Essex, State of Massachusetts, have invented an Improvement in Steering Apparatus, of which the following description, in connection with the accompanying drawings, is a specification, like figures on the drawings representing like parts.

This invention has for its object the production of novel, efficient, and simple steering apparatus for effecting a change in the angular position of a steering member by or through a suitable controller without lost motion or backlash, the construction and arrangement being such that while the steering member is instantly responsive to movement of the controller the latter is not subject to vibration, shock, or jarring when impact with any obstacle tends to move the steering member.

A secondary or subsidiary function of my invention provides for the automatic locking of the steering member in any given position.

My invention is applicable to vehicles of different types wherein a steering member is employed to direct its path of movement whether the vehicle be a boat or a land-vehicle—such, for instance, as an automobile—and as the latter serves to clearly illustrate the construction, arrangement, and mode of operation of my invention I have shown one practical embodiment of my invention in connection therewith. In such vehicles it is common practice to mount the steering-wheels on pivotally-mounted swinging spindles which are fulcrumed on a suitable support or axle which is usually fixed relatively to the vehicle-body, the spindles being swung on their pivots to control the course of the vehicle, the term "steering member" hereinafter employed being used to designate the movable member on which the steering-wheel is mounted in the case of a land-vehicle. When an obstacle—such as a hillock, rut, or stone in the roadway—is struck by the steering-wheel, the tendency is to suddenly and violently turn or wrench the steering member out of its previous position, and this violent movement is transmitted as a shock or jar through the controlling means to the operator. There is also a constant and very disagreeable jarring or vibration transmitted to the operator in the same manner while the vehicle is running even when no unusual obstacles are encountered. This is due principally to the fact that the steering member is necessarily fulcrumed at some distance from the vertical plane passing through the wheel-rim, giving considerable leverage, and that the arm, which is extended laterally from the steering member at its pivot, is made quite long, to give the requisite power to quickly swing the steering member. The wheel thus has a powerful and long leverage when through meeting an obstacle it operates to swing the steering member, and it is transmitted through the intervening connections to the controller and thence to the operator. A rack-and-pinion connection has been used and a worm and worm-gear have also been devised interposed between the steering member and the controller; but while such devices to a certain extent overcome some of the objectionable features of the apparatus they are slow in operation and are open to the practical objections of lack of sensitiveness and delicacy and have more or less lost motion in transmitting the movement of the controller to the steering member.

In my present invention I have obviated the objectionable features of such devices, while securing rapid and sensitive operation, and, as stated, I am also enabled to automatically lock the steering member in any given position.

The various novel features of my invention will be hereinafter described, and particularly pointed out in the following claims.

Figure 1 is a front elevation of one embodiment of my invention applied to a vehicle, the spokes of the wheels being broken off and the wheel-rims omitted. Fig. 2 is an enlarged top or plan view of the main portion of the steering apparatus on the line $x\ x$, Fig. 1. Fig. 3 is an enlarged sectional detail on the line $x'\ x'$, Fig. 2, of a portion of the operating connection between the steering member and the controller. Fig. 4 is an enlarged sectional detail thereof on the line $x^2\ x^2$, Fig. 2, taken at right angles to Fig. 3. Figs. 5 and 6 are perspective details, centrally broken out, of the seats, to be described, on the power-transmitting members; and Fig. 7 is a perspective view of a modification of my invention, to be hereinafter described.

Referring to Fig. 1, wherein my invention is shown as applied to the steering-gear of an automobile vehicle, the axle 1, connected by any suitable spring 2 with the body 3 of the vehicle, (see dotted lines,) is so arranged as to have no steering movement relatively to the body and is provided at its ends with upright yokes or hangers 4, in which the wheel-spindles 5 are pivotally mounted, swinging laterally on fulcrum-pins 6, extended through an upright boss or hub 7, secured to or forming a part of the inner end of each spindle. The steering-wheels 8 are rotatably mounted on the spindles in any well-known manner. I have herein shown each spindle as provided with two oppositely-extended arms 9 10 of equal length and set at an angle to the spindle, (see Fig. 1,) and, as therein shown, the arms are bifurcated or forked and spring from at or near the upper ends of the hubs 7 above the top of the axle 1, for a purpose to be described. These arms are quite short, as will be seen from Fig. 2; but by using two and extending them in opposite directions I am enabled to more desirably distribute the leverage than with a single arm of double the length for swinging the spindle or steering member 5 by movement of the controller. At the same time, however, by reducing the length of these arms the tendency of an obstruction striking the wheel to swing the spindle is materially diminished and vibration and jarring of the controller due thereto and to overcoming the slight inequalities of a road are reduced to a minimum. The arms 9 of the two spindles are connected by a longitudinally-rigid power-transmitting member, (shown as a flat bar or rod 11 of the requisite strength,) pivotally connected at its ends to said arms 9 at 12, said member being shown as above the axle 1 and in front thereof. (See Fig. 2.) At its center, as herein illustrated, said member 11 is provided with a seat, consisting of two rearwardly-extended ears 13 on the top of the bar and provided on their opposed parallel edges with ⌐-shaped flanges 14, Fig. 6, and partly shown in Fig. 3. The rearwardly-extended arms 10 of the spindles are connected by a transmitting member 15, similar in general construction to the member 11 and pivotally connected at its ends at 16 to the arms 10, said members 11 and 15 being arranged in parallelism, as shown in Fig. 2, and being located in the same horizontal plane; but the member 15 is behind the axle 1. A centrally-located seat is also formed on said member by transverse ears 17 on the under side thereof and forwardly extended, the parallel opposed edges of the ears having L-shaped flanges 18, Figs. 1, 3, and 5, for a purpose to be described.

The axle 1 has secured to or forming a part thereof at its center, as herein shown, an upturned stud or post 19 between the members 11 and 15 and threaded at its upper end to receive a retaining-nut 20, and on this stud, which serves as a common axis of rotation therefor, I have mounted two like eccentrics 21 22, shown as connected and oppositely set and located in parallel planes one above the other, the lower end of the hub 23 resting on the top of the axle and its upper end being reduced, as at 24, Figs. 3 and 4. An eccentric strap or block, shown as a rectangular plate 25, for the upper eccentric 21 is slidably mounted in the seat on the transmitting member 11, and while it has a transverse movement relatively to said member it moves in unison with the latter in the direction of the length thereof, said strap being vertically supported by the two members 11 and 15 and guided at its side edges by the seat-flanges 14 of the member 11. A similar eccentric strap or block 26 coöperates with the lower eccentric 22, and it is slidably mounted in the seat of the transmitting member 15, the flanges 18 supporting it vertically and also guiding it in its transverse sliding movement relative to the member 15. In order to prevent the strap from lifting in the seat, the bar 15 is provided with overhanging shoulders 27, which project over the top of the strap.

From the foregoing description and the drawings it will be manifest that when the eccentrics are turned on their common axis 19, but in opposite directions, the respective straps will be moved laterally and oppositely in parallel planes and will thereby cause opposite and simultaneous longitudinal movement of the transmitting members 11 and 15, so that the steering members or spindles 5 will be swung on their fulcra in opposite directions to change the angular position thereof. The transmitting members move in parallelism and one will pull on the arm while the other pushes on the other arm of the spindle and with no lost motion or backlash. So, too, each transmitting member is subjected to compressive strain on that side of its center corresponding to the direction of movement and to tensile strain on the other side of its center, as will be obvious. As the straps are moved sidewise they also have a fore-and-aft movement transverse and relative to the transmitting members, and this is provided for by their transverse sliding connection with each member, as described.

While the movement transmitted from the eccentrics to the spindles 5 is rapid and readily effected, to thereby render the movement of the spindles quickly responsive it will be manifest that the spindles will be held locked, as it were, in any given position and any tendency to turn the spindles by impact of the wheels with an obstacle is counteracted and prevented by the connections between the spindles and eccentrics.

The controller for governing the movement of the spindles may be arranged in various ways, according to the circumstances of the case; but I have herein shown the controller as an upright steering-post 28, Fig. 1, rotatively mounted in suitable manner on the body of the vehicle and having a hand-bar or handle 29, the lower end of the post being provided with a sprocket-gear 30, connected by a sprocket-chain 31 with a second sprocket-gear 32, rotatably mounted on the stud 19 and held in place by the nut 20. The lower end of the gear-hub 33, Figs. 3 and 4, is recessed to receive the reduced portion 24 of the eccentric hub, and screws or other fastenings 34 secure the two rigidly together.

By making the gear 32 larger than the gear 30 a small angular movement of the latter will be increased in the former to provide for ample swinging movement of the steering members or spindles 5.

If desired, the controller could be upwardly extended from the eccentrics, obviously, and the arrangement shown in Fig. 1 may be changed in various particulars, as would occur to those skilled in the art, the particular structure of the means for effecting the movement of the eccentrics about their axis being of no particular moment, so far as my invention is concerned.

For vehicles adapted for carrying heavy loads and intended to run at a moderate or low speed the construction shown in the modification, Fig. 7, is well adapted. In this construction the steering member is shown as the axle 35, pivotally mounted at 36 to swing bodily about the same, and a transverse bar 37 is secured to the axle at its center and extends equally in front and behind it. Parallel bars 38 are pivotally connected at 39 with the cross-bar 37, and at their ends the bars are pivoted at 40 to like cross-bars 41, the bar 37 being shown as U-shaped and having the extremities of its upturned portions bent out oppositely and bifurcated, as at 37×, to receive the bars 38. Each cross-bar has rigidly secured to it an upright pin 42, having fast upon it a second cross-bar 43 above and parallel to the cross-bar 41, and said pins 42 are rotatably mounted in any suitable manner at their upper ends in the frame of the vehicle, as in side bars or reaches 44. Manifestly, rotative movement of the pins 42 will swing the attached cross-bars, and the bars 38 will be moved longitudinally in opposite directions and in parallelism, such movement being transmitted through the U-shaped cross-bar 37 to swing the axle 35 on its center 36 to thereby steer the vehicle. To effect the rotation of the pins 42, I have employed substantially the mechanism best shown in Fig. 2 the cross-bars 43 being equivalent to the two sets of oppositely-extended arms 9 10. The transmitting members 11 and 15 are pivotally connected at their ends to the extremities of the cross-bars 43, and said members are actuated by the eccentrics 21 22 and their straps or blocks 25 and 26, slidably mounted in the seats 13 and 17, respectively, as has been described.

In Fig. 7 the steering-post 45 is secured directly to the upper end of the eccentric-hub, so that lateral swinging movement of the handle 46 will operate to vary the angular position of the steering member or axle 35. As relates to the particular form of device for rotating the eccentrics, however, that shown in Fig. 1 may be employed or any other suitable form desired or convenient.

My invention is not restricted to the precise construction herein shown and described, as the same may be modified or changed in various details of construction and arrangement without departing from the spirit and scope of my invention.

Having fully described my invention, what I claim as new, and desire to secure by Letters Patent, is—

1. In steering apparatus, an angularly-movable steering member, oppositely-extended arms rigidly connected therewith at an angle, longitudinally rigid and movable transmitting members pivotally connected with the arms and movable in parallelism in opposite directions to change the angular position of the steering member, a rotative controller, and eccentric connections between it and said transmitting members, to effect their longitudinal movement simultaneously in opposite directions, the part of one of said members between the steering member and the eccentric connections acting under tensile, and the corresponding part of the other member acting under compressive, strain during such movement.

2. In steering apparatus, an angularly-movable steering member, oppositely-extended arms rigidly connected therewith at an angle, longitudinally rigid and movable transmitting members pivotally connected with the arms and movable in parallelism in opposite directions to change the angular position of the steering member, a rotative controller having a fixed bearing and having its axis located between said transmitting members, two like eccentrics oppositely set and movable in unison about the axis of the controller by rotative movement of the latter, and connections between the eccentrics and the transmitting members, to effect their longitudinal movement simultaneously in opposite directions and in parallelism.

3. In steering apparatus, an angularly-movable steering member, oppositely-extended short arms rigidly connected therewith at an angle, longitudinally rigid and movable transmitting members connected with the arms and movable in parallelism and in opposite directions longitudinally to change the angular position of the steering member, a rotative controller having secured to it two oppositely-set, like eccentrics, the axis of the controller being located between the transmitting members, and eccentric-straps operatively connected with the transmitting members to move in unison therewith in the direction of the length of said members, and relatively thereto at right angles to their length, whereby movement of the eccentrics on their axis effects longitudinal movement of said transmitting members simultaneously in opposite directions and in parallelism.

4. In steering apparatus, an angularly-movable steering member, oppositely-extended short arms rigidly connected therewith at an angle, longitudinally rigid and movable transmitting members connected with the arms and movable in parallelism and in opposite directions longitudinally to change the angular position of the steering member, and manually-controlled means to move the transmitting members longitudinally and simultaneously in opposite directions.

5. In steering apparatus, an angularly-movable steering member, oppositely-extended short arms rigidly connected therewith at an angle, longitudinally rigid and movable transmitting members connected with the arms and movable in parallelism and in opposite directions longitudinally to change the angular position of the steering member, a controlling member, and connections between it and the said transmitting members, to move them longitudinally and simultaneously in opposite directions in parallelism and to automatically lock them at any point in the path of movement of the steering member.

6. In steering apparatus, an angularly-movable steering member, oppositely-extended short arms rigidly connected therewith at an angle, longitudinally rigid and movable transmitting members connected with the arms and movable in parallelism and in opposite directions longitudinally to change the angular position of the steering member, two oppositely set, like eccentrics having a common axis of rotation located between the transmitting members, means to rotate said eccentrics simultaneously in opposite directions about their common axis, and eccentric-straps operatively connected with said transmitting members to move with the latter in the direction of the length of said members and having a sliding movement relative thereto and at right angles to their length, to thereby effect longitudinal and simultaneous opposite movement of said transmitting members in parallelism, to swing the steering member.

7. In steering apparatus, an angularly-movable steering member, oppositely-extended arms rigidly connected therewith at an angle, longitudinally rigid and movable transmitting members pivotally connected at their outer ends with the arms and movable in parallelism in opposite directions to change the angular position of the steering member, a transverse seat on each member, an eccentric block or strap slidably mounted in each seat, two like eccentrics oppositely set and connected to move in unison, said eccentrics coöperating with the blocks or straps, and having their common axis of rotation located between the transmitting members, and means to rotate the eccentrics, to act upon said members through the said blocks or straps and effect opposite longitudinal movement of the transmitting members.

8. In steering apparatus, an angularly-movable steering member, oppositely-extended arms rigidly connected therewith at an angle, longitudinally rigid and movable transmitting members pivotally connected at their outer ends with the arms and movable in parallelism in opposite directions to change the angular position of the steering member, a transverse seat on each member, an eccentric block or strap slidably mounted in each seat, and located in parallel planes, two connected and oppositely set, like eccentrics to coöperate respectively with the blocks or straps, and a manually-operated controller axially secured to said eccentrics and having its axis of rotation located between the transmitting members.

9. In steering apparatus for vehicles, an axle, a steering-wheel, a spindle on which it is rotatably mounted, pivotally connected with the axle, oppositely-extended arms rigidly connected with the spindle at an angle thereto, longitudinally-rigid transmitting members pivotally connected at their outer ends with said arms and movable in parallelism longitudinally in opposite directions to swing the wheel-spindle on its pivot, a rotative controller, and eccentric connections between it and said transmitting members, to effect their longitudinal movement simultaneously in opposite directions.

10. In steering apparatus for vehicles, an axle, wheel-spindles pivoted thereto, two oppositely-extended and like arms rigidly connected with each spindle at an angle thereto, two rigid transmitting members pivotally connected at their ends to the said arms, and movable longitudinally in opposite directions to swing the wheel-spindles on their pivots, a rotative controller mounted on the axle, and eccentric connections between said controller and the transmitting members, angular movement of said controller acting through the eccentric connections to effect opposite and simultaneous longitudinal movement of the transmitting members.

11. In steering apparatus for vehicles, an axle, wheel-spindles pivoted thereto, two oppositely-extended and like arms rigidly connected with each spindle at an angle thereto, two rigid transmitting members pivotally connected at their ends to the said arms, and movable longitudinally in opposite directions to swing the wheel-spindles on their pivots, a rotative controller mounted on the axle, and operating connections between the controller and transmitting members, said connections including a slidably-mounted member on and movable transversely to each transmitting member, and two like and oppositely-set eccentrics coöperating respectively with the slidably-mounted members and movable with the controller as a common axis of rotation, to convert rotative movement of the controller to longitudinal movement of the transmitting members.

12. In steering apparatus for vehicles, an axle, wheel-spindles pivoted thereto, two oppositely-extended and like arms rigidly connected with each spindle at an angle thereto, two rigid transmitting members pivotally connected at their ends to the said arms, and movable longitudinally in opposite directions to swing the wheel-spindles on their pivots, two superposed and connected like eccentrics oppositely set, two parallel slide members mounted on the transmitting members and movable in unison therewith longitudinally and relatively thereto transversely, the eccentrics coöperating with and acting to move said slide members simultaneously and oppositely, and means to rotate the eccentrics about a common fixed axis.

13. In steering apparatus for vehicles, an axle, wheel-spindles pivoted thereto, two oppositely-extended and like arms rigidly connected with each spindle at an angle thereto, two rigid transmitting members pivotally connected at their ends to the said arms, and movable longitudinally in opposite directions to swing the wheel-spindles on their pivots, a transverse seat on each transmitting member, an eccentric-strap mounted to slide in each seat relatively to the transmitting member and to move in unison therewith longitudinally, said straps being located in parallel planes, two oppositely-set, like eccentrics coöperating with the straps, a fixed, common axis of rotation for said eccentrics, and means to rotate the latter in unison on said axis in opposite directions.

14. In steering apparatus for vehicles, an axle, wheel-spindles pivoted thereto, two oppositely-extended and like arms rigidly connected with each spindle at an angle thereto, two rigid transmitting members pivotally connected at their ends to the said arms, and movable longitudinally in opposite directions to swing the wheel-spindles on their pivots, an upright stud fixedly mounted on the axle substantially at the center and extended between the transmitting members, two like and oppositely-set, connected eccentrics rotatably mounted on the stud, connections between the eccentrics and said transmitting members, to convert rotative movement of the eccentrics to longitudinal, opposite movement of the transmitting members, and means to effect rotative movement of the eccentrics.

15. In steering apparatus for vehicles, an axle, wheel-spindles pivoted thereto, two short and oppositely-extended equal arms rigidly connected with each spindle at its pivot and at an angle to the spindle, two longitudinally-rigid transmitting members pivotally connected at their ends with the arms and longitudinally movable in parallelism in opposite directions to swing the spindles on their pivots, a rotative controller, and connections between it and the transmitting members, to convert rotative movement of the former into longitudinal movement of the latter.

16. In steering apparatus for vehicles, an axle, wheel-spindles connected therewith by vertical pivots, connections between the wheel-spindles in front and behind their pivots respectively, and attached to the spindles eccentric to their pivots, to swing the spindles together, a controller therefor, and combined motion-converting and locking means interposed between the controller and said connections, to convert rotative movement of the former into longitudinal movement of the latter to swing the spindles, and to lock the latter automatically at any point in their paths of movement.

17. In steering apparatus for vehicles, a fixed axle, hangers secured to the ends thereof, spindles each carrying a wheel and pivotally mounted in the hangers, two oppositely-extended, like short arms secured to each spindle adjacent its pivot and set at an angle to the spindle, two rods pivotally connected at their opposite ends to the spindle-arms, a manually-governed rotative controller having a fixed bearing on the axle between the rods, and like operating connections between said controller, and the two rods, rotative movement of the controller being converted by said connections into opposite and longitudinal movement of the rods simultaneously and in parallelism, to swing the wheel-spindles.

18. In steering apparatus for vehicles, a fixed axle, hangers secured to the ends thereof, spindles each carrying a wheel and pivotally mounted in the hangers, two oppositely-extended, like short arms secured to each spindle adjacent its pivot and set at an angle to the spindle, two rods pivotally connected at their opposite ends to the spindle-arms, a rotative controller mounted on the axle, and a power-transmitting connection between said controller and each rod, each connection including a disk-like member secured to and eccentrically arranged with respect to the center of movement of the controller, said members being oppositely set, and a second member coöperating with each disk-like member and arranged to move in unison with one of the rods in the direction of its length and relatively to said rod transversely thereto, upon rotative movement of the controller, and means to slidably support said second members on the rods.

In testimony whereof I have signed my name to this specification in the presence of two subscribing witnesses.

FREDERICK R. WHITE.

Witnesses:
 JOHN C. EDWARDS,
 EDITH M. STODDARD.